United States Patent [19]
Minor et al.

[11] Patent Number: 5,581,019
[45] Date of Patent: Dec. 3, 1996

[54] GASKET/INSERTABLE MEMBER AND METHOD FOR MAKING AND USING SAME

[75] Inventors: Raymond B. Minor, Elkton, Md.; Gordon L. McGregor, Landenberg, Pa.; Anders B. R. Karlstrom, Gnotzheim, Germany

[73] Assignee: W. L. Gore & Associates, Inc., Newark, Del.

[21] Appl. No.: 110,405

[22] Filed: Aug. 23, 1993

Related U.S. Application Data

[63] Continuation-in-part of Ser. No. 23,642, Feb. 26, 1993, Pat. No. 5,429,869, and a continuation-in-part of Ser. No. 915,484, Jul. 16, 1992, Pat. No. 5,262,234.

[51] Int. Cl.⁶ .................................................. G01M 15/00
[52] U.S. Cl. .................................................. 73/115; 285/910
[58] Field of Search ........................ 73/774, 862.624, 73/862.68, 862.625, 862.626, 862.635, 862.642, 115; 340/665, 652; 285/910

[56] References Cited

U.S. PATENT DOCUMENTS

| | | |
|---|---|---|
| 3,358,257 | 12/1967 | Painter et al. . |
| 3,783,173 | 1/1974 | Twomey . |
| 3,854,736 | 12/1974 | Farnam . |
| 4,042,747 | 8/1977 | Breton et al. . |
| 4,070,219 | 1/1978 | Farnam . |
| 4,082,893 | 4/1978 | Okita . |
| 4,145,317 | 3/1979 | Sado et al. . |
| 4,163,204 | 7/1979 | Sado et al. . |
| 4,234,535 | 11/1980 | Okita . |
| 4,569,634 | 11/1986 | Mantell ............................ 417/63 |
| 4,715,235 | 12/1987 | Fukui et al. . |
| 4,734,034 | 3/1988 | Maness et al. . |
| 4,781,535 | 11/1988 | Frawley ............................ 417/53 |
| 4,794,366 | 12/1988 | Sakamoto . |
| 4,801,484 | 1/1989 | Yao et al. . |
| 4,856,993 | 8/1989 | Maness et al. . |
| 4,874,549 | 10/1989 | Michalchik . |
| 4,966,155 | 10/1990 | Jackson . |
| 4,969,105 | 11/1990 | Gaenssle . |
| 4,971,638 | 11/1990 | Bickley et al. . |
| 5,112,664 | 5/1992 | Waterland, III . |
| 5,121,929 | 6/1992 | Cobb . |
| 5,421,195 | 6/1995 | Wlodarczyk ............................ 73/115 |

FOREIGN PATENT DOCUMENTS

| | | |
|---|---|---|
| 0143338 | 6/1985 | European Pat. Off. . |
| 0321225 | 6/1989 | European Pat. Off. . |
| 2196514 | 3/1974 | France . |
| 2800844 | 7/1978 | Germany ............................ 73/862.626 |
| 2258732 | 2/1993 | United Kingdom . |
| 9117701 | 11/1991 | WIPO . |

*Primary Examiner*—Robert Raevis
*Attorney, Agent, or Firm*—David J. Johns; Carol A. Lewis White

[57] ABSTRACT

An improved insertable member is provided suitable for use as a seal monitoring gasket. In one embodiment, the insertable member employs an embedded electrically conductive element responsive to stresses placed upon it. When fatigue or a break occurs along the member body, changes in the electrical transmission properties of the conductive element provides data warning of changes or risks to the seal between component parts. The insertable member can include different conductive elements providing changes in signal from a variety of stresses which may be placed upon it, including tension, pressure, and/or temperature. Additionally, by forming the insertable member and/or the conductive element from material which will undergo changes in electrical properties upon compression, the insertable member can also provide feedback of the amount of constriction between component parts for proper installation and maintenance.

7 Claims, 10 Drawing Sheets

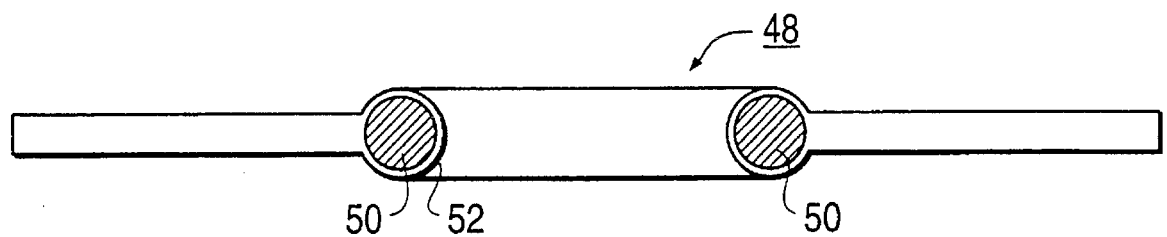
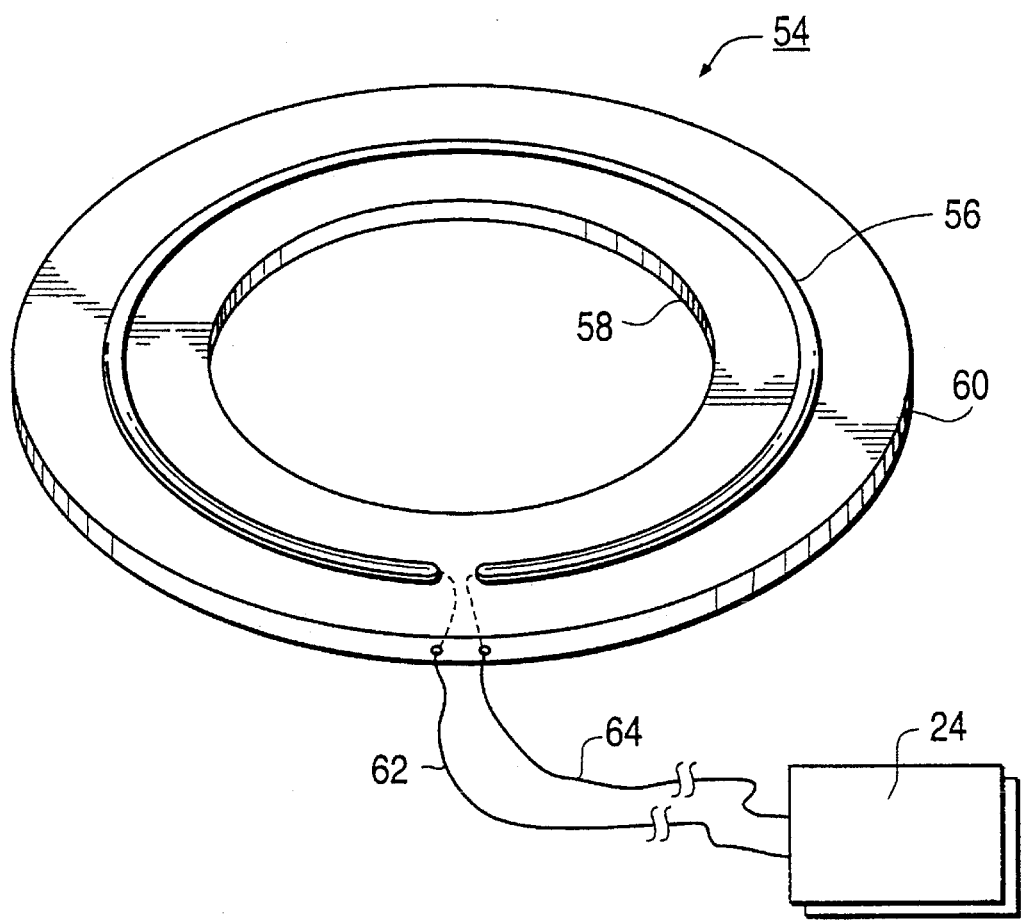

GASKET/INSERTABLE MEMBER AND METHOD FOR MAKING AND USING SAME

The present application is a continuation-in-part of U.S. patent application Ser. No. 023,642, filed Feb. 26, 1993, now U.S. Pat. No. 5,429,869, and a continuation-in-part of U.S. patent application Ser. No. 915,484, filed Jul. 16, 1992, now U.S. Pat. No. 5,262,234.

BACKGROUND OF THE INVENTION

1. Field of the Invention

The present invention relates to gaskets and other insertable members for sealing or placement between component parts of various equipment. More particularly, the present invention relates to gaskets and other apparatus which monitor the seal or other conditions between component parts and detect leaks or other problems therebetween.

2. Description of Related Art

A wide variety of gaskets of different shapes, sizes and properties have been developed for particular applications. For example, U.S. Pat. Nos. 3,783,173 issued Jan. 1, 1974, to Twomey, and 4,966,637 issued Oct. 30, 1990, to Laborie each discloses electrically conductive gaskets; U.S. Pat. No. 5,112,664 issued May 12, 1992, to Waterland, III, discloses a gasket made from expanded polytetrafluoroethylene (PTFE) for use in corrosive environments.

In each instance, the gaskets serve to seal between component parts of various equipment and/or to reduce wear between component parts. Among the more common materials used in gaskets today are various elastomers (e.g. VITON fluoroelastomer, nitrile rubber, ethylene-propylene-diene monomer (EPDM) rubber, various fluoropolymers (e.g. polytetrafluoroethylene (PTFE), expanded PTFE (ePTFE)), fluorinated ethylenepropylene (FEP), perfluoroalkoxy polymer (PFA), polyvinylidene fluoride (PVDF)). The growing use of more durable materials, such as ePTFE, has greatly improved gasket operative life and reliability.

Despite improvements in the quality and operative life of gaskets, the risk and cost of gasket failures remains substantial. First, gaskets must be properly installed and maintained to assure full operational life. In this regard, insufficient or excessive torque applied against the gasket in installation can lead to leakage and/or premature gasket failure. Applying the correct amount of torque generally requires expensive equipment or subjective experience achieved through trial-and-error. Even the proper use of a torque wrench provides only an indirect measurement of the amount of pressure which is actually applied to the gasket material.

Likewise, seals between component parts should be periodically checked for leakage which may indicate cracks or wear in the gasket. Such inspections may be important to avoid a catastrophic gasket failure during normal operation and all the costs inherent in such a failure, such as potential equipment damage, excessive down-time, and costly and possibly dangerous leaks and spills. Additionally, the replacement of gaskets is often an important reason for scheduled maintenance procedures, with the schedule of frequent maintenance sometimes being a function of anticipated timing for gasket replacement.

A number of these problems are discussed in U.S. Pat. No. 4,969,105 issued Nov. 6, 1990, to Gaenssle. This patent addresses the problem that the process of tightening a gasket tends to compress the gasket material and leave gaps through which leaks can occur. The problem of loosening of the seal around the gasket is addressed by Gaenssle by providing a feedback system monitoring the amount of torque which must be applied to a gasket in order to keep it adequately compressed. Unfortunately, this system has a number of deficiencies. First, the use of a dedicated torque-producing drive system is considered far too expensive and complicated for most gasket applications. Second, this system does not provide monitoring of the overall condition of the gasket itself. Third, this system does not address applications where component parts are not attached around a gasket by bolts or similar torque producing means.

U.S. Pat. No. 5,121,929 issued Jun. 16, 1992, to Cobb also attempts to provide feedback on the amount of load applied to a gasket. In this patent an electronic load sensor comprising discrete electrodes and pressure sensitive electrically resistive material is sealed within a cavity in the body of the gasket. While this device may function adequately in its intended harsh environments, it is believed that this device is overly complex and expensive to manufacture for widespread use. Additionally, this gasket does not attempt to address the concerns of detection of leaks due to gasket breakage or similar failure.

Although equipment exists which can monitor the pressure between component parts for other applications, and theoretically could be used to assure correct installation and operation of gaskets, generally such equipment is likewise far too expensive and/or fragile to be practical for most applications. For example, U.S. Pat. No. 3,358,257 issued Dec. 12, 1967, to Painter et al. discloses a force and moment transducer employing semiconductor piezoresistive ribbons in two or four arm active bridge circuits to measure forces between equipment and support structure, such as in the aerospace service environment. Although such equipment may work well for its intended uses, such a device cannot provide true gasketing function and is considered too complicated, bulky, and expensive to monitor gasket seals in common applications.

In yet another usage U.S. Pat. No. 4,781,535 issued Nov. 1, 1988, to Frawley et al. a continuous electrical circuit trace is applied across most of the surface of a diaphragm for a diaphragm pump. The circuit trace serves to measure both continuity of the diaphragm and potential ground fault condition between the circuit trace and pumping liquid. While this device may be effective at monitoring a pump diaphragm for leaks, it does not address the problems inherent with gasket maintenance, much less the desire for a reliable way to monitor compression forces applied during the installation of a gasket.

Accordingly, it is a primary purpose of the present invention to produce a gasket or other insertable member which contains reliable means to verify its structural integrity during installation and operation and to determine conditions between component parts between which the insertable member is installed.

It is a further purpose of the present invention to provide such a member which is durable, and relatively inexpensive and easy to construct, install, and operate.

It is yet another purpose of the present invention to produce a gasket which can be adapted to monitor the compressional forces applied against it to assure proper installation and seal.

It is another purpose of the present invention to employ recent advances in conductive fiber technology to produce a seal-verifying gasket with improved operational properties.

These and other purposes of the present invention will become evident from review of the following specification.

SUMMARY OF THE INVENTION

The present invention provides an improved gasket or other insertable member, and method for making and using it, which provides feedback on its condition during operation.

In a basic form, a gasket of the present invention comprises a body, an electrically conductive element embedded within the body, and electrical monitoring apparatus in electrical communication with the conductive element. A change of electrical signal from the conductive element to the electrical monitoring apparatus during use indicates that some deformation or failure has occurred along the body.

The preferred insertable member of the present invention employs a conductive element and/or body which undergo measured changes in electrical property upon encountering stress. In this manner, the precise condition of the insertable member can be constantly or periodically monitored to determine its status and predict when maintenance may be required. Ideally, one or more conductive elements within the insertable member should provide modified electrical signals both when placed under compression and when encountering tension. Through this means, proper installation compression can be determined and maintained and insertable member fatigue or failure can be detected and monitored.

By forming the conductive element and/or a gasket from one of a number of suggested conductive polymer compositions, a seal verifying gasket of the present invention can be constructed relatively easily and inexpensively. Additionally, the insertable member of the present invention can be constructed from a wide selection of durable material suitable for many different applications over a wide range of operating conditions.

DESCRIPTION OF THE DRAWINGS

The operation of the present invention should become apparent from the following description when considered in conjunction with the accompanying drawings, in which:

FIG. 9 is a cross-sectional view of yet another embodiment of an insertable member of the present invention in the form of a gasket;

FIG. 10 is a three-quarter elevational view of a further embodiment of an insertable member of the present invention in the form of a gasket shown attached to a schematic representation of electronic monitoring apparatus;

DETAILED DESCRIPTION OF THE INVENTION

The present invention is directed to gaskets for use in sealing between various component parts. As used herein, the term "gasket" is intended to encompass any seal used between joints and fittings, or other component parts to assist in isolating or protecting such parts, and/or to prevent the entry or escape of gas, liquid, or solid. Additionally, the term "insertable member" as used herein is intended to include "gaskets" as well as other applications where a sensor unit can be placed between component parts to serve as a spacer or monitoring device, such as a pressure, tension, weight or stress indicator or a clearance indicator.

Figure 1:
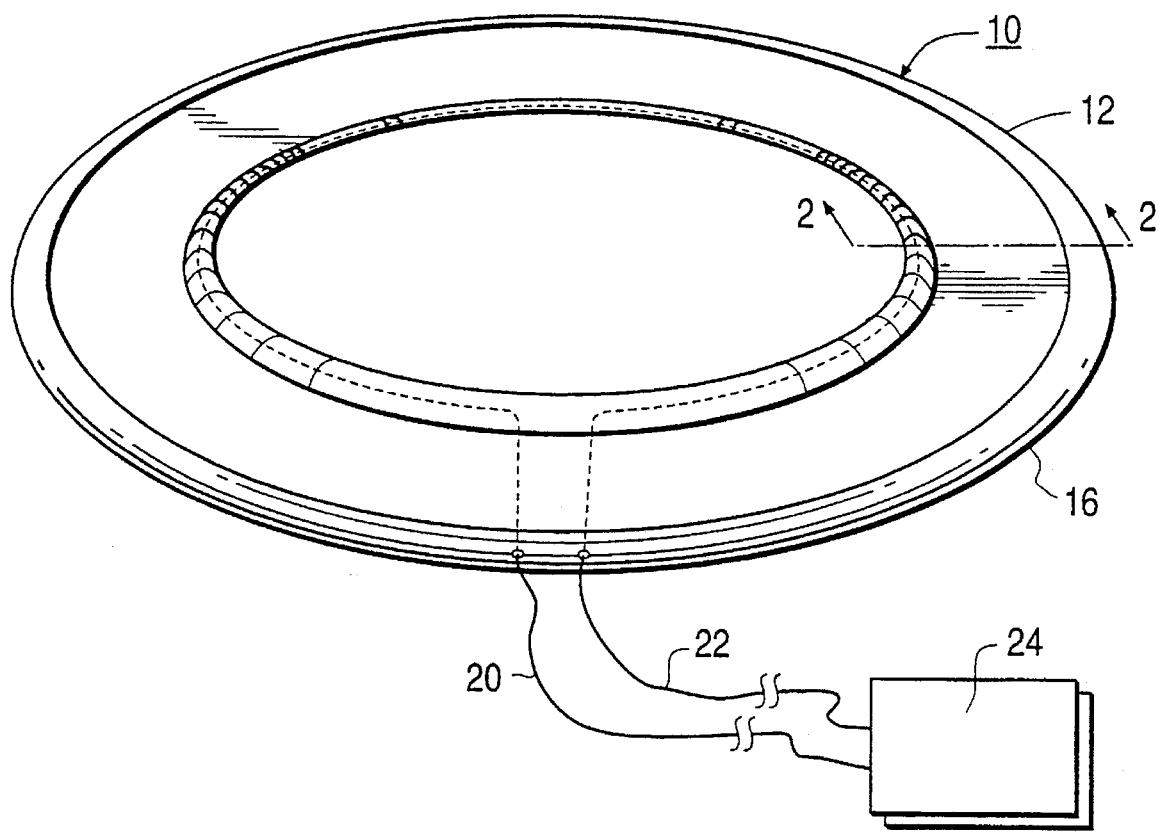
FIG. 1 is a three-quarter elevational view of one embodiment of an insertable member of the present invention in the form of a gasket shown attached to a schematic representation of electronic monitoring apparatus.
Figure 2:
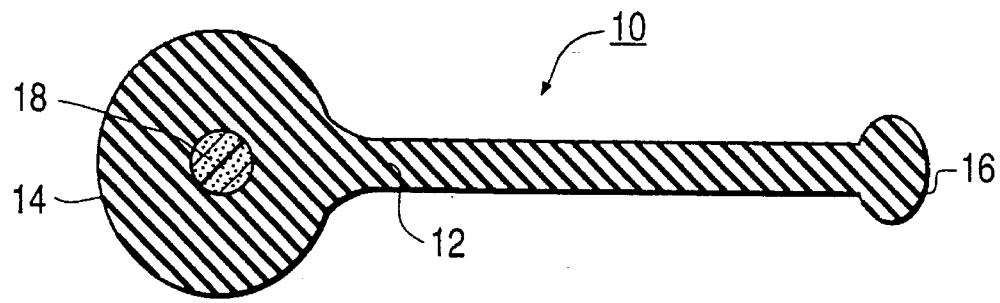
FIG. 2 is a cross-sectional view of the gasket shown in FIG. 1 taken along line 2—2.

One gasket 10 of the present invention is illustrated in FIGS. 1 and 2. This gasket 10 comprises: a circular gasket body 12, with an inner edge in the form of a sealing bead 14 and an outer edge 16; an electrically conductive element 18 embedded within the gasket body 12 centered within its sealing bead 14; and two electrical leads 20, 22 for electrical interconnection between the conductive element 18 and electrical monitoring apparatus 24.

Central to the present invention is the electrically conductive element 18. This conductive element 18 forms a continuous electrical sensor around most or all of the gasket body 12. In its simplest form, the structural integrity of the gasket of the present invention can be determined by applying an electric current through lead 20, conductive element 18, and lead 22. If electric current is detected in lead 22, this indicates that the gasket body 12 has not broken along its edge so as to terminate electric flow through the conductive element 18. If no electric current is detected, this warns of a break in the conductive element 18 and probable damage to the gasket 10.

Additionally, the gasket 10 of the present invention can provide far more informative data on the status and operation of the gasket. As is explained below, it is preferred to use a conductive element 18 which, alone or in conjunction with the gasket body 12, undergoes changes in one or more of its electrical properties when stress is applied to it.

Changes in the electrical signals carried by such a conductive element 18 can then be used to monitor changes in the gasket long prior to cracking or other serious gasket problem.

As the term "stress" is used in the present application, it is intended to include any form of mechanical, electrical, or chemical strain which may impact the performance of insertable member. Among the stresses which may be monitored by the present invention are changes in tension, pressure, temperature, and/or chemical/electrical properties of the insertable member. For instance, many conductive materials will experience changes in their electrical conductivity or impedance when they are laterally stretched. Other common properties which can be readily measured include time domain reflectometry, optical time domain reflectometry (with optical fibers embedded within the gasket); capacitance, temperature changes, etc.

Further, as is set forth in greater detail below, some materials experience changes in electrical properties when compressive forces are placed upon them. These materials can also be used to monitor the amount of compressive forces applied to the gasket 10.

Using these principles, periodic or constant monitoring of the status of the gasket 10 is possible. For instance, a base-line electrical signal can be determined by applying an electric current through the gasket 10 of the present invention when it is first installed. By acquiring a second signal reading at a later time, the second signal can be compared with the base-line signal to determine if any changes have occurred. Determination and quantification of changes can then be used to chart the operational "health" of the gasket. Further, by establishing a pattern of gasket performance, it may also be possible to predict when the gasket is nearing the end of its operational life.

Using these principles, a myriad of gasket monitoring techniques may be feasible. In addition to monitoring of individual gasket installations on-site or from a remote location, it is equally possible to establish a network of gasket monitors which can provide instant feedback on the condition of the equipment or conduits between equipment. In fact, by providing appropriate conduits and computer controlled valving, gasket failure can be detected in a first line and flow can be automatically routed around the defective gasket to a parallel second line without shutting down any equipment. A signal can then notify an operator that replacement of the gasket is required.

Similarly, with a compressive force responsive conductive element, a base-line signal can be determined prior to the installation of the gasket 10. Once installed, changes in the electrical properties of the gasket can be used to judge carefully the amount of compression which is being applied to the component parts surrounding the gasket 10. In this manner, the amount of compression of the gasket can be readily quantified to avoid under or over compression of the gasket.

The electrical monitoring apparatus 24 may take any suitable form which will provide some quantitative measurement of an electrical property of the conductive element. In its preferred form, the electrical apparatus 24 comprises an analog or digital meter or signal generating device which simply provides a measure of conductivity, impedance or other property of the gasket.

The conductive element 18 illustrated in FIGS. 1 and 2 comprises a polyolefin, preferably a polytetrafluoroethylene (PTFE), fiber containing conductive filler, such as carbon black, metal, or metal oxide. As is disclosed in co-pending U.S. patent application Ser. No. 915,484, now allowed, such a conductive fiber can be formed from a film comprising an expanded PTFE (ePTFE) matrix with conductive particles contained therein.

As is disclosed in the co-pending application, this film may be obtained in a number of manners. The film may be formed by blending a fine powder PTFE resin with mineral spirit and then adding a conductive particulate filler to obtain a compound of fine powder PTFE resin and conductive particulate filler. Alternatively, an aqueous dispersion PTFE resin is mixed with conductive particulate filler and the mixture is co-coagulated by rapid shearing of the aqueous dispersion, or though destabilization of the aqueous dispersion with salt, acid, polyethylene imine or the like. A coagulum of fine powder PTFE resin and conductive particulate is then formed and dried into cakes. Once dry, the cakes are crumbled and lubricated with a mineral spirit and blended to form a compound.

Either of the above described compounds can then be compressed into a billet and subsequently extruded through a die by a ram-type extruder forming a coherent extrudate. The coherent extrudate is then compressed between a pair of calender rollers to reduce its thickness. Mineral spirit is removed from the calendered extrudate by passing the extrudate over a series of heated rollers set above the boiling point of the mineral spirits.

The dry extrudate can then be expanded by the general procedure taught in U.S. Pat. 3,953,566 issued Apr. 27, 1976, to Gore. As is disclosed in the co-pending patent application, the dry coherent calendered extrudate is initially rapidly stretched uniaxially in a longitudinal direction 1.2× to 5000× its starting length, and preferably 2× to 100×, at a stretch rate over 10% per second at a temperature of between 35° to 327° C. This process produces an expanded porous PTFE matrix in continuous film form in which conductive particulate filler is distributed.

The film may next be slit to a desired width to form a continuous slit film fiber having a substantially rectangular profile. The continuous slit film fiber may then be stretched in a longitudinal direction up to fifty times its length, such as through the general method of stretching taught by U.S. Pat. No. 3,543,566 issued to Gore. This second stretching step increases the strength of the resultant fiber through increased orientation of the ePTFE matrix. The total amount of stretch is a function of the degree to which the PTFE matrix has been filled with filler—the greater the percentage of particulate filler, the less the continuous slit film fiber may be stretched.

The continuous slit film fiber may subsequently be subjected to a temperature in excess of 342° C. in order to perform an amorphous locking step. This basic procedure is again taught in U.S. Pat. No. 3,543,566 to Gore. If the fiber is fully restrained longitudinally, the amorphous locking step further increases the strength and density of the expanded continuous slit film fiber.

As is also disclosed in the co-pending patent application, alternatively, prior to slitting, the ePTFE matrix in continuous film form may be compressed and densified, such as through use of adjacent nip rollers, as is taught in U.S. Pat. No. 4,985,296 to Mortimer, Jr. Compression and densification increases contact between individual conductive particulate filler particles thereby increasing conductivity of the ePTFE matrix in continuous film form. To increase the strength of the thin ePTFE matrix in continuous film form, multiple layers of the coherent extrudate can be stacked longitudinally and calendered upon one another forming a layered article. The layered article is subsequently dried, expanded and densified to produce a thin ePTFE matrix of greater strength when compared to an analogous thin ePTFE matrix produced from a single layer of ePTFE matrix. The thin ePTFE matrix may then be subjected to the amorphous locking step previously described. The thin ePTFE matrix in continuous film form may then be slit to a desired width by a slitter or similar means for cutting films to form a thin continuous fiber having a substantially rectangular profile.

Once such a fiber is formed, its conductivity can be increased through densification. Preferably, densification is accomplished by twisting the fiber about its central longitudinal axis. The resultant twisted fiber is more dense than a similar untwisted fiber and appears rounder. Moreover, the twisted fiber exhibits greater maintenance of its volume resistivity upon exposure to tensile forces when compared to an analogous compressed untwisted fiber. The twisting may comprise 1 to 18 or more twists per centimeter, with 4 to 11 twists per centimeter being preferred.

Fibers can be formed through this procedure having a wide range of bulk tensile strength and volume resistivities, such as: a tensile strength of 65,000 KPa or greater with a volume resistivity of $1 \times 10^3$ ohm cm or less; a tensile strength of 65,000 KPa or greater with a volume resistivity of 10 ohm cm or less; and a tensile strength of 200,000 KPa or greater and a volume resistivity of $1 \times 10^3$ or less. Tensile strength may be determined using the method described in ASTM Standard D882-81 (i.e. calculated by dividing the maximum longitudinal load by the original cross-sectional area of the specimen). The test performed varied from the test as published with respect to the material tested. ASTN D882-81 is for testing thin plastic sheeting and not fibers. The difference is due to the dimensions of the sample. The thickness of the fibers is determined through a snap gauge. Care is taken not to crush the sample with the presser foot of the snap gauge to obtain an accurate thickness. Width of the sample is determined through measurement on an optical microscope. The samples are tested on a constant rate of grip separation machine to break. Force at maximum load samples is determined. The volume resistivity of the fibers may be determined using the method described in ASTM D257-90, "Standard Test Methods for D-C Resistance or Conductance of Insulating Material".

Without intending to limit the present invention, examples of fibers formed in accordance with the above description are illustrated below.

EXAMPLE 1

A fiber was produced in the following manner.

A dry mixture of 85% by weight of a fine powder PTFE resin and 15% by weight of a conductive carbon black (Vulcan XC-72R available from Cabot Corporation, Boston, Mass.) was combined in a blender with an amount of an odorless mineral spirit (Isopar K available from Exxon Corporation) until a compound was obtained. The compound was compressed into a billet and extruded through a 6.4 mm gap die attached to a ram-type extruder to form a coherent extrudate. The coherent extrudate was passed between a pair of calender rolls gapped to reduce the thickness of the coherent extrudate to 4.1 mm.

Subsequently, the odorless mineral spirit was volatilized and removed, and the dry coherent calendered extrudate was expanded uniaxially in the longitudinal direction twice (2×) its original length by passing the dry coherent calendered extrudate over a series of rotating heated rollers. The dry coherent calendered extrudate was slit to 6.4 mm widths by passing the coherent extrudate between a set of gapped blades. The slit coherent extrudate was expanded uniaxially in the longitudinal direction at a ratio of 21.3 to 1 to form the fiber of the instant invention. The fiber was subsequently subjected to an amorphous locking step by exposing the fiber to a temperature in excess of 342° C. for a period of time.

The fiber was subsequently twisted at various amounts about its longitudinal axis to compress the instant fiber. Twisting of the fiber was accomplished on a standard fiber twisting machine at room temperature. The physical properties and the effect of twisting on the properties of the fiber of Example 1 are found in Table 1.

TABLE 1

| Sample | Denier (g/9000 m) | Measured Resistance @ 50 cm | Cross Sectional Area (cm2) | Density (g/cc) | Volume Resistance | Bulk Tensile Strength KPa |
|---|---|---|---|---|---|---|
| untwisted | 667 | >300 m ohm | 0.0010 | 0.74 | >6000 ohm cm | 150,000 |
| 4 twists/cm | 670 | 11700 k ohm | 0.00051 | 1.49 | 119 ohm cm | 320,000 |
| 8 twits/cm | 769 | 6990 k ohm | 0.00051 | 1.71 | 70 ohm cm | 360,000 |

EXAMPLE 2

A fiber was produced in the following manner.

A mixture of 75% by weight of a fine powder PTFE resin in an aqueous dispersion and 25% by weight of a conductive carbon black (Ketjenblack 300-J available from Akzo Chemical) was made. First a slurry was made of carbon black in deionized water, and agitated with a rotating impeller. Fine powder PTFE aqueous dispersion (AD-059, available from ICI Americas Inc.) was added, and the carbon black and PTFE co-coagulated. After drying, the coagulum was combined in a blender with an amount of an odorless mineral spirit forming a compound, the compound was compressed into a billet, and the billet extruded to form a coherent extrudate similar to the steps followed in Example 1.

The coherent extrudate was compressed between calender rolls and the odorless mineral spirit was removed in a method similar to the steps followed in Example 1. The dry coherent calendered extrudate was subsequently expanded at a ratio of 2:1 at a temperature of 270° C.

The dry coherent calendered extrudate had an average thickness of 0.38 mm and a density of 0.374 g/cc. The dry coherent calendered extrudate was slit to 14.7 mm widths by passing the dry coherent calendered extrudate between a set of gapped blades. The slit coherent extrudate was expanded uniaxially in the longitudinal direction at a ratio of 14.35 to 1 and subsequently subjected to an amorphous locking step as in Example 1.

The fiber was subsequently twisted as in Example 1. The physical properties and the effect of twisting on the properties of the fiber of this Example are found in Table 2.

TABLE 2

| Sample | Denier (g/9000 m) | Measured Resistance @ 50 cm | Cross Sectional Area (cm2) | Density (g/cc) | Volume Resistance | Bulk Tensile Strength KPa |
|---|---|---|---|---|---|---|
| 4 twists/cm | 1478 | 198 k ohm | 0.0027 | 0.61 | 10.7 ohm cm | 79,000 |
| 8 twists/cm | 1690 | 85 k ohm | 0.0018 | 1.04 | 3.1 ohm cm | 130,000 |

When employed in the present invention as the conductive element 18, the twisted conductive fiber tends to exhibit relatively consistent resistivity along its entire length. As a result, when stresses are experienced by the conductive element 18, such as with the weakening of the gasket body with the formation of cracks or other defects, a quantitative measurement of such deformation can be achieved. Further, the relatively high tensile strength of the fiber assures that the status of the gasket can continue to be monitored even after cracks have begun to form therein.

Figure 3:
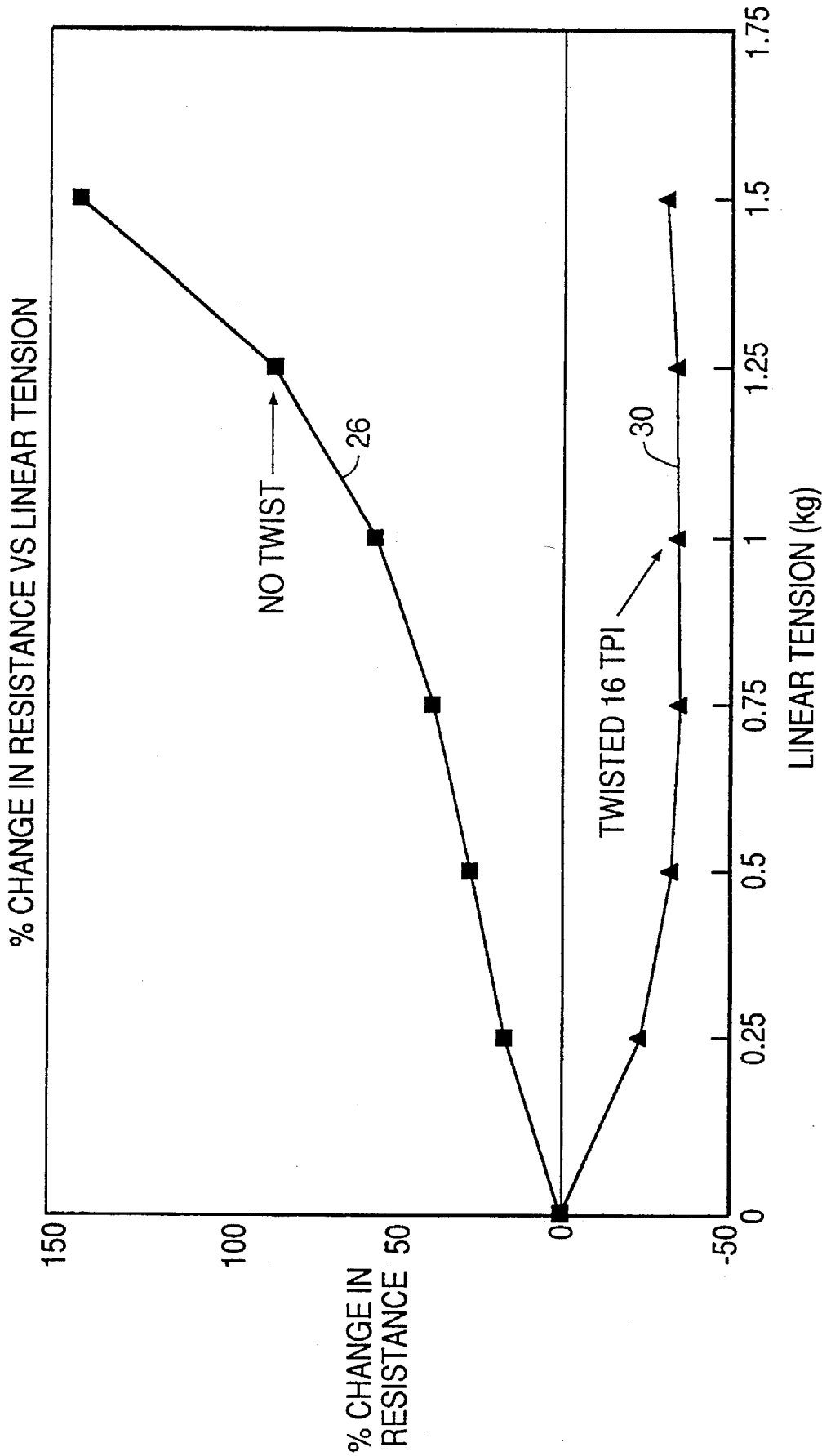
FIG. 3 is a graph depicting percentage change in resistance verses linear tension of two potential conductive elements for use in an insertable member of the present invention.

The relative advantages of employing a twisted conductive fiber over other conductive elements is shown in the graphs of FIGS. 3 through 6. FIG. 3 depicts the percentage (%) change in resistance verses linear tension (kg) of two different samples of conductors: line 26 is the plot for a conventional flat, filled ePTFE conductive fiber (i.e. showing an increase in resistance with an increase in tension); and line 30 is the plot of a twisted filled ePTFE fiber (i.e. showing a decrease in resistance with an increase in tension).

Figure 4:
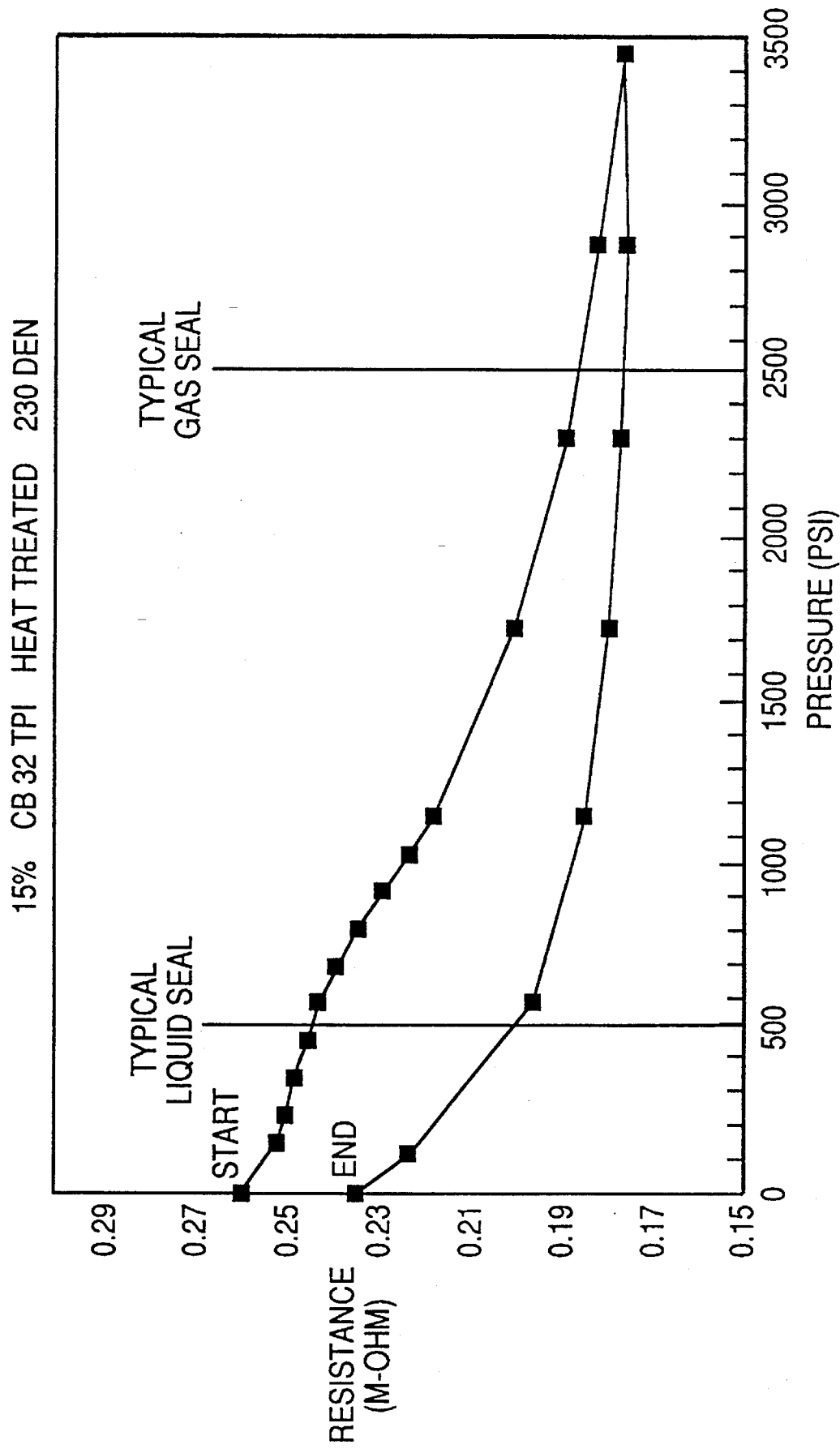
FIG. 4 is a graph depicting resistance verses compressive force of a twisted, filled ePTFE conductive element for use in an insertable member of the present invention.
Figure 5:
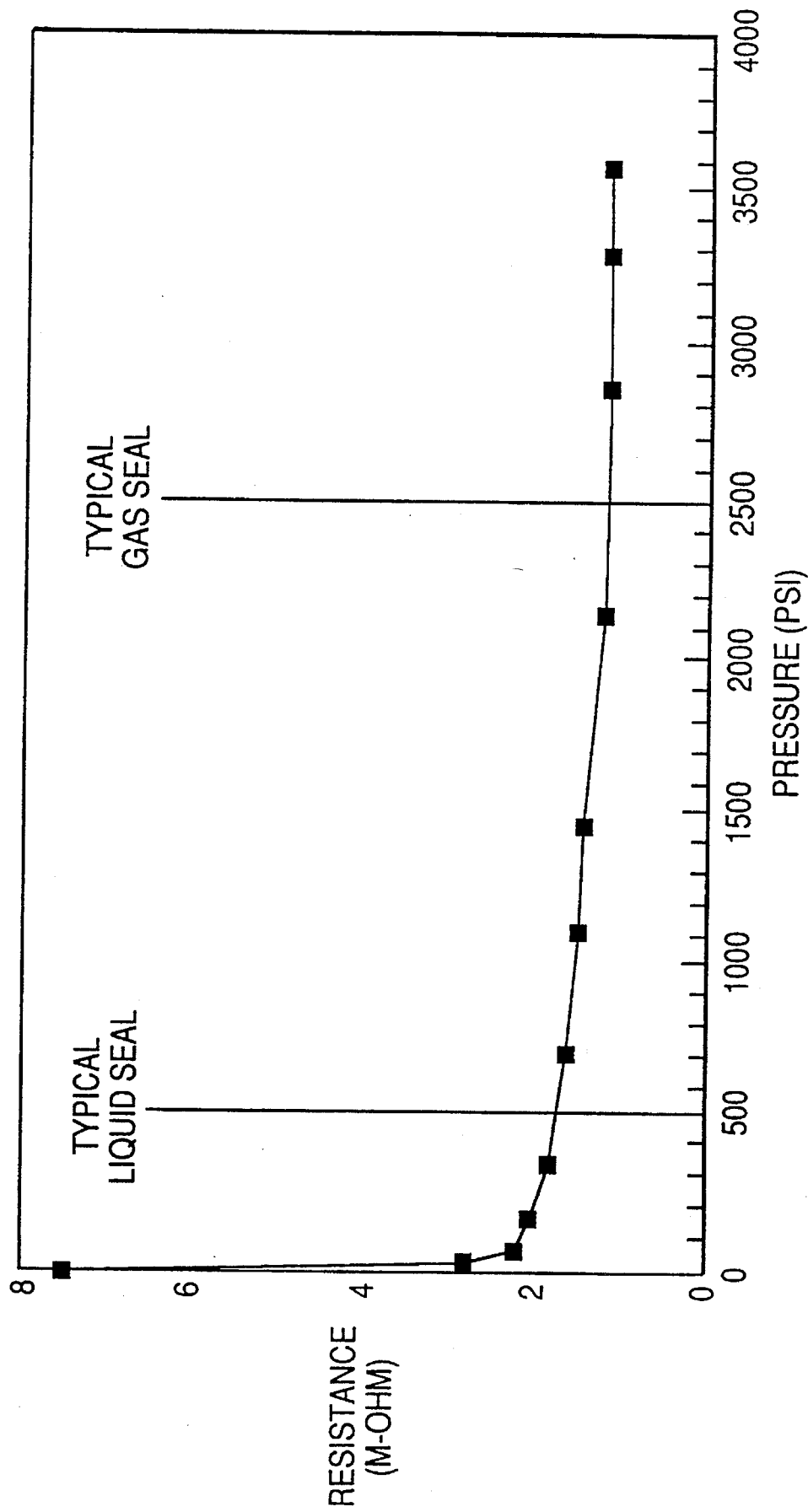
FIG. 5 is a graph depicting resistance verses compressive force of a non-twisted ePTFE conductive element.

The difference in performance between a heat treated twisted fiber and a flat fiber is illustrated in FIGS. 4 and 5. FIG. 4 illustrates the resistance (k-ohm) verses pressure (psi) of a conductive filled fiber of ePTFE comprising 15% carbon black, 230 denier, 32 twists per inch, and heat treated. Heat treatment is accomplished by dragging the fiber over a 400° C. hot plate for approximately 2.5 seconds. The significant drop of resistance between a typical 500 psi liquid seal pressure and a typical 2,500 psi gas seal pressure assures that changes in the gasket performance within this range will be sufficiently great to be monitored. The graph also shows an increase in resistance as the pressure is reduced.

By contrast, FIG. 5 illustrates a flat, non-twisted conductive fiber of ePTFE comprising 15% carbon black and 220 denier. This graph demonstrates that a non-twisted conductive fiber experiences a significant change in resistance at lower pressure levels. As such, a fiber of this form would be suited for applications where changes at much lower pressures must be monitored, such as in an insertable member used to measure clearance or contact detection.

Figure 6:
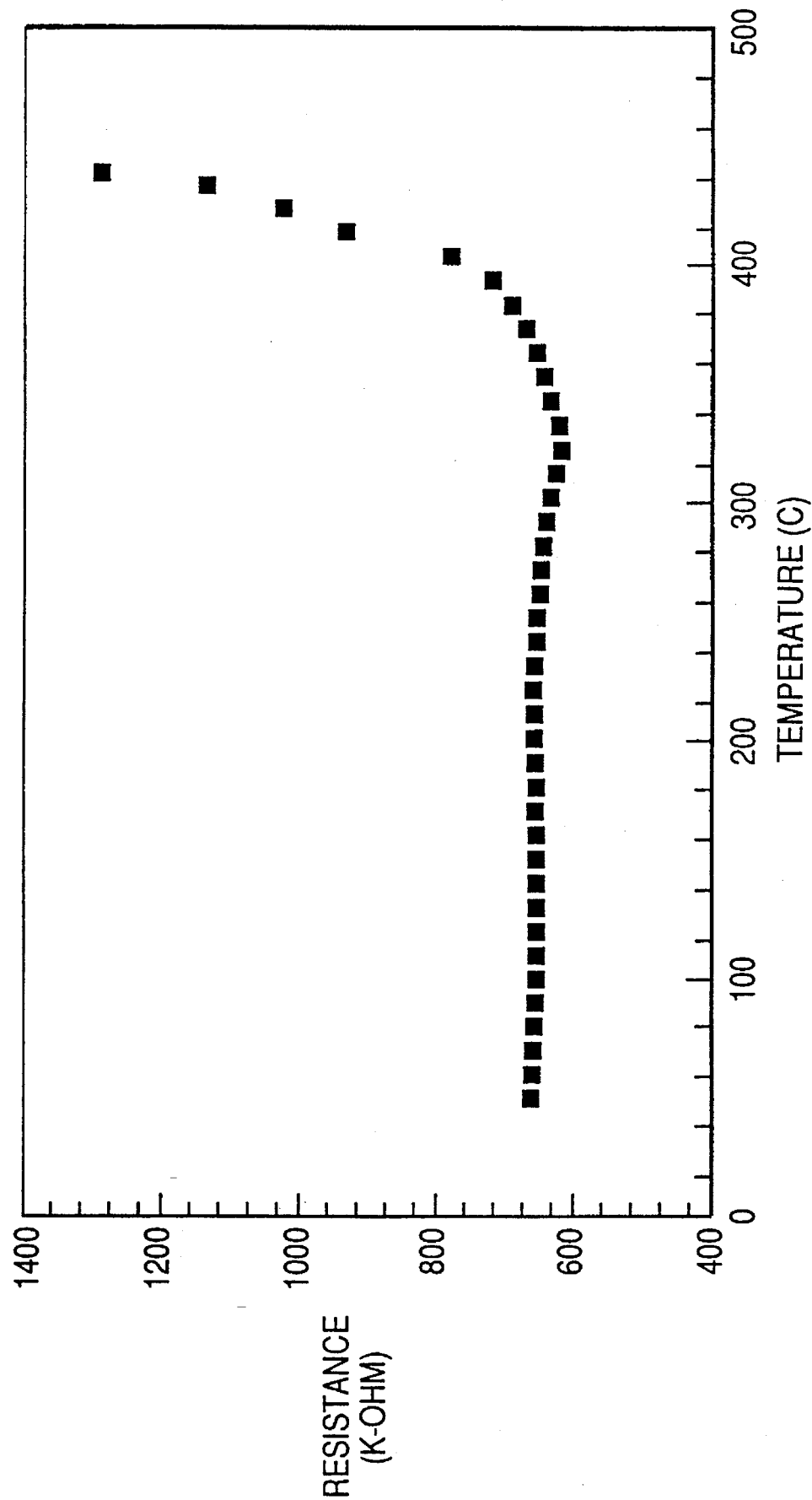
FIG. 6 is a graph depicting resistance verses temperature of a twisted, heat treated fiber for use in an insertable member of the present invention.

FIG. 6 shows a change in resistance verses temperature of a heat treated 15% carbon loaded ePTFE fiber having 16 twists per inch and 740 denier. As this graph shows, when produced with these properties, this fiber will remain stable up to a temperature of approximately 300° C. As such, a fiber of this form would be particularly useful for monitoring temperature changes between 300° and 450° C. It should be evident that other fibers can be made in with different temperature parameters to monitor other gasket applications.

An additional benefit of using a conductive fiber of PTFE can be realized when employed with a PTFE gasket material. By forming the gasket and the conductive fiber from identical or similar materials, it is expected that the conductive fiber should provide a very realistic feedback of the status of the gasket body. For example, it is expected that a PTFE conductive fiber should experience extreme strain and breakage at around the same amount of tension as the gasket body itself. As such, a far better reading of gasket condition may be available than would be possible with dissimilar gasket and conductive materials. Additionally, by forming the conductive material from a material similar to that forming the gasket body assures that the conductive member does not interfere with the gasket function.

Figure 7:
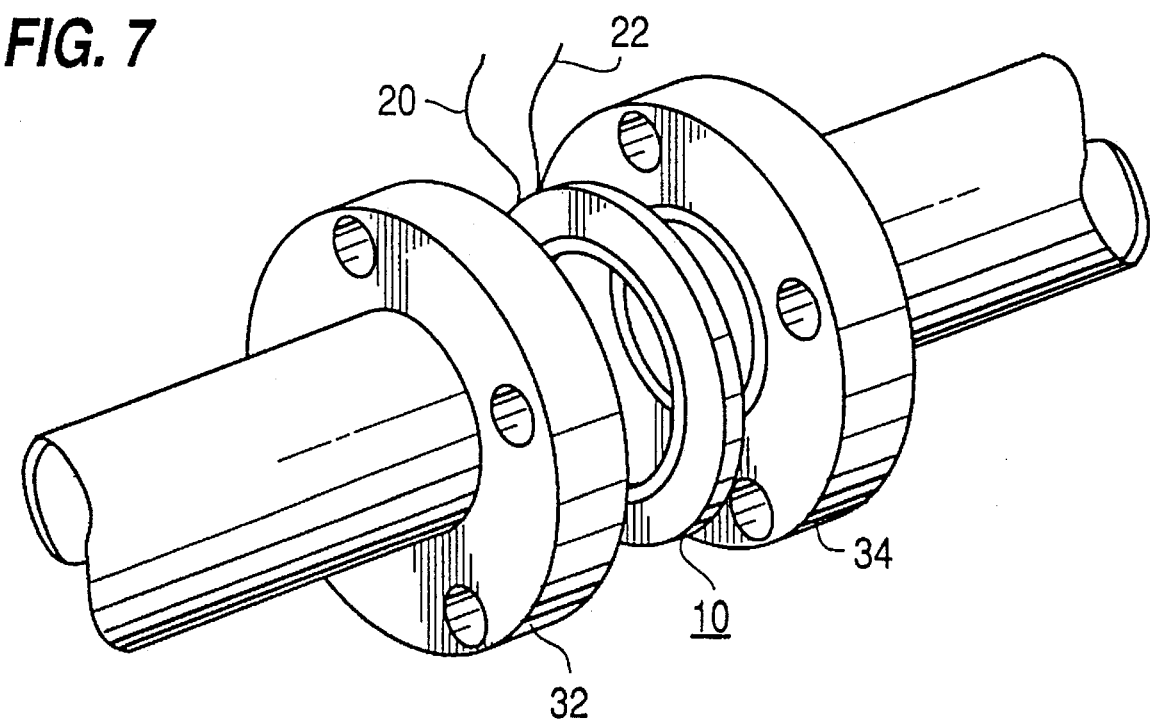
FIG. 7 is a three-quarter isometric view of an insertable member of the present invention in the form of a gasket shown in exploded orientation with two component parts (flanges)

One possible application of the gasket 10 of the present invention is shown in FIG. 7. In this instance, the gasket 10 is mounted between two flanges 32, 34 to form a seal therebetween. Lead lines 20, 22 can then be attached to an electrical source and monitoring apparatus to provide periodic or constant verification of the seal between the flanges 32, 34.

Figure 8:
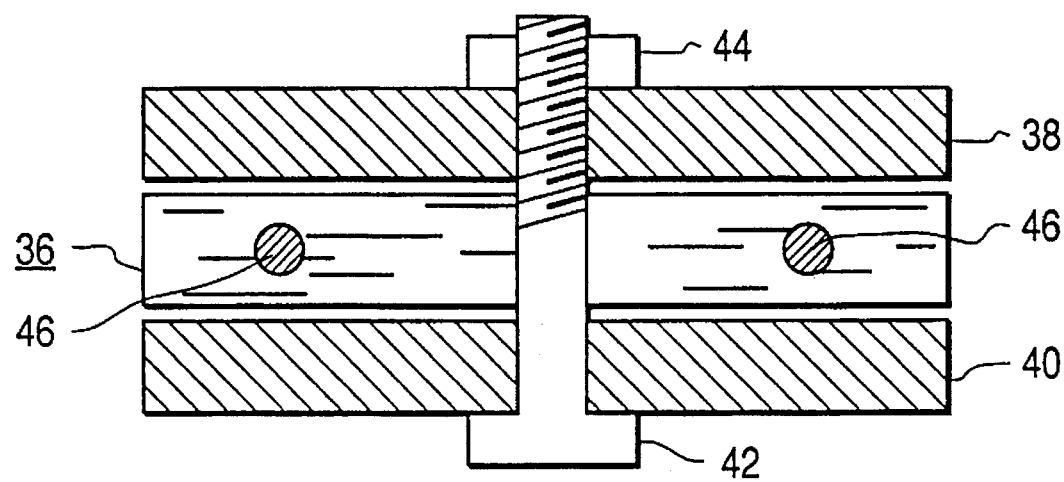
FIG. 8 is a cross-sectional view of another embodiment of an insertable member of the present invention in the form of a gasket shown mounted between two component parts.

Another embodiment of a gasket 36 of the present invention is shown in FIG. 8. In this embodiment, the gasket 36 is mounted between two surfaces 38, 40 by bolt 42 and nut 44. A conductive element 46 is embedded within the gasket 36, encircling the center of the gasket 36 and bolt 42. In this embodiment, the gasket 36 itself is constructed from a material which will undergo change in electrical properties when subjected to stress. For example, as is explained in greater detail below, the gasket may be constructed from a resilient ePTFE material which will undergo change in its dielectric properties when subjected to compression or other stresses. As such, the conductive element 46 may comprise any conductive material, including conventional metallic or non-metallic electrical conductor.

When attached to electrical monitoring apparatus in the manner previously discussed, a base-line electrical property of the conductive element 46 surrounded by gasket 36 can be readily determined. Once stress is applied to the gasket 36, changes in dielectric performance of the gasket will occur, allowing monitoring of the status of the gasket.

One of the benefits of the gasket of FIG. 8 is that its electrical performance can be observed to assure proper compression of the gasket between component parts 38, 40. Since changes in electrical properties of the resilient gasket 36 will occur when compressive pressure is applied to the gasket, the gasket of the present invention can provide a durable and relatively inexpensive means to assure consistent mounting compression of the gasket or other insertable member. Further, once the gasket is mounted in place and a base-line compression electrical reading is established, further electrical readings can be periodically made to assure that the insertable member remains under consistent pressure over time.

One form of gasket material which will provide the necessary properties for a resilient gasket for use with the present invention is disclosed in co-pending U.S. patent application Ser. No. 023,642, filed Feb. 26, 1993. As is disclosed therein, a polyolefin, such as PTFE, may be expanded by employing expandable microspheres blended into a polyolefin composition. Such microspheres comprise a plastic coating surrounding an expandable liquid or gaseous volatile fluid. As is explained in U.S. Pat. No. 3,615,972 issued Oct. 26, 1971, to Morehouse et al., thermoplastic microspheres are adapted to expand dramatically when exposed to heat. These microspheres are monocellular particles comprising a body of resinous material encapsulating a volatile fluid. When heated, the resinous material of thermoplastic microspheres softens and the volatile material expands—causing the entire microsphere to increase substantially in size. On cooling, the resinous material in the shell of the microspheres ceases flowing and tends to retain its enlarged dimension; the volatile fluid inside the microsphere tends to condense, causing a reduced pressure in the microsphere.

Such thermoplastic microspheres are now commercially available from Nobel Industries Sweden, Sundsvall, Sweden, under the trademark EXPANCEL®. These microspheres may be obtained in a variety of sizes and forms, with expansion temperatures generally ranging from 80° to 130° C. A typical EXPANCEL microsphere has an initial average diameter of 9 to 17 microns and an average expanded diameter of 40 to 60 microns. According to Nobel Industries, the microspheres have an unexpanded true density of 1250–1300 kg/m$^3$ and an expanded density below 20 kg/m$^3$.

In one embodiment of the present invention, EXPANCEL type 091DU is employed. This product comprises an off-white dry powder with a particle size between 5 and 50 microns. The shell of the microsphere comprises acrylonitrile or methacrylonitrile. The volatile liquid comprises isopentane.

It has been found that by mixing a dry preparation of EXPANCEL microspheres with a dispersion of PTFE or similar polymer and then heating the resulting composition, the polymer will undergo expansion in three-dimensions to achieve a porous network of polymeric nodes and fibrils. A mixture of PTFE, in the form of paste, dispersion or powder, and microspheres, in the form of dry powder or solution, are mixed in proportions of 1 to 90% by weight microspheres, with 5 to 85% by weight of microspheres being preferred. It should be appreciated that a wide range of products may be created even with a percentage of microspheres of merely 0.1 to 5% by weight; similarly, for some uses, filled products may be created with a percentage of microspheres and/or other fillers between 90 to 99 or more percent by weight. Mixture may occur by any suitable means, including dry blending of powders, wet blending, co-coagulation of aqueous dispersions and slurry filler, high shear mixing, etc.

Once mixed, preferably the resulting composition is heated to a temperature of 80° to 180° C. for a period of 0.5 to 10 minutes to activate the microspheres.

With currently available microsphere technology, if further density reduction is desired, the composition may be re-heated to a temperature of 40° to 240° C. and mechanically expanded through any conventional means, such as those disclosed in U.S. Pat. No. 3,963,566 to Gore. In fact, this material lends itself to use with a variety of mechanical expansion techniques, whether before, during and/or after microsphere expansion.

The resulting products have proven to have superior properties. For instance, when formed around a wire conductor, the composition proved to be an excellent electrical insulation, with typical dielectric constants of 1.04 to 1.25, and typical velocities of propagation of 89–98%. Depending on application, insulations can be created with virtually any dielectric constant in these ranges or greater. From experimentation to date, it has been shown that insulations with dielectric constants of lower than 1.12 and 1.06 can also be readily produced.

Two of the improved properties of these expanded compositions are their substantial non-amorphously locked ("unsintered") dimensional stability and their exceptional elasticity/resilience to deformation. First, the polymer/microsphere compositions form a coherent mass which tend to retain their expanded dimensions without sintering or other further treatment. Additionally, the coherent mass can be formed without pre-treatment of the PTFE polymer (i.e. allowing applications for expanded PTFE without the need to extrude or otherwise treat the PTFE polymer before expansion).

Second, the polymer/microsphere composition has the ability to "puff" into a resilient cushion-like coherent mass with substantial proportions of open air spaces therein. The mass can expand in all dimensions and remains highly self-cohesive despite the dramatic increase in its dimensions and typical air space contents from 10 to 50 to 80% or more. Although not necessary, by mechanically expanding the PTFE/microsphere composition in addition to the microsphere expansion, the resulting product becomes even less dense. This "puffed" mass has proven to be remarkably elastic and resilient to deformation. For instance, a typical expanded mass will withstand compression of 50% or more with nearly 100% rebound to original shape.

As is disclosed in co-pending application Ser. No. 023,642, the expansion qualities of the polymer/microsphere compositions can be applied to create coherent expanded PTFE products in virtually any imaginable shape, including inducing expansion to occur in only predetermined directions. At least three different mechanisms may be employed in this regard—selective heating, external constriction, and/or internal constriction.

First, polymer/microsphere compositions may be selectively heated to activate expansion in only certain directions or in certain areas. In this regard, heat may be focused through any known means to activate the microspheres only in the desired locations (e.g. use of focused heat through conduction or convection, directed electrical current, or a laser).

Second, by applying external constriction in the form of a mold, expansion of the composition can be directed into only certain directions. This is a particular promising attribute in the production of various molded gasket products. Moreover, this allows for the expansion of gasket products in place to form even more effective seals between component parts. To control expansion in this context, the polymer/microsphere composite can be wrapped in a film (e.g. a plastic tube or a tape of PTFE).

Third, as is known, certain polymers can be treated to produce internal orientation of their structure so that they are resistant to expansion in certain directions. For example, by mechanically expanding PTFE in the manner previously referenced, increased tensile strength can be established in certain directions within the expanded PTFE lattice (e.g. in the x and/or y axis). Through conventional means of mechanical expansion (e.g. stretching, calendering, extruding, etc.) of the PTFE polymer in predetermined directions prior to activation of the microspheres, this should provide internal limitation of the growth of the polymer/microsphere compositions and cause growth in the unrestrained direction during activation of the microspheres.

It should be evident that one or more of these molding methods may be applied in concert to provide unique application-specific properties. Moreover, by selectively constricting the products, many different characteristics can be imparted, such as continuous PTFE products with variable densities or shapes, ribbed PTFE products, etc.

Without intending to restrict the scope of the present invention, the following represent examples of various formulations of polymer/expandable microsphere compositions which may be used in the present invention.

EXAMPLE 3

A 5% EXPANCEL/95% PTFE by weight sample was made by the following method: A slurry of 7.8 g of EXPANCEL—091 DU obtained from Nobel Industries, 1519 Johnson Ferry Road, Marietta, Ga. 30062, and 551.2 g of de-ionized water was prepared in a 2 liter baffled stainless steel container. While the slurry was agitating at 800 RPM, 148.2 g of PTFE in the form of a 20.0% dispersion was rapidly poured into the vessel. The PTFE dispersion was an aqueous dispersion obtained from ICI Americas, Inc. After 30 seconds, 2.2 g of a 0.4% solution of a cationic modified polyacrylimide was added to initiate the co-coagulation. After a total of 1 minute 20 seconds, the mixer was stopped. The coagulum settled to the bottom of the vessel and the effluent was clear.

The coagulum was dried at 110° C. in a convection oven. The dried cake was chilled below 0° C. It was hand ground through a 0.635 cm mesh stainless steel screen. A 35 g sample of screened powder was lubricated with mineral spirits at a ratio of 0.375 cc solvent per gram of powder. The mixture was chilled, passed through a 0.635 cm mesh screen again, tumbled, then allowed to sit at 18° C. for 16 hours and was re-tumbled.

A 2.54 cm diameter pellet was formed in a cylinder at 200 psi. The pellet was then extruded through a 0.254 cm diameter die at a ram rate of 50.8 cm/min.

The extruded beading was then dried at 105° C. in a convection oven for 1 hour. A 19.04 cm long piece of the dried extrudate measuring 0.297 cm in diameter, weighing 1.924 gms, and a calculated density of 1.457 g/cc was then placed in a convection oven at 165° C. for 3 minutes to "puff" the microspheres (i.e. heat activating and subsequent growing of the spheres). Upon removal from the oven the sample was measured to be 28.1 cm long, having a diameter of 0.569 cm, a weight of 1.918 g, and a calculated density of 0.268 g/cc.

EXAMPLE 3a

A 15.0 cm long section was cut from the sample produced in Example 3. A 5.0 cm long section was marked off in the center of this piece using an indelible marker. The sample was placed in a convection oven at 165° C. for 3 minutes. The sample was then grabbed by hand outside of the marks using high temperature gloves. Upon removal from the oven, the sample was immediately and rapidly stretched by separating hands. The time of stretch was estimated to be approximately 0.25 seconds. The sample was then cut at the marks and measurements were taken on the center section. The sample measured to be 49.0 cm long, 0.399 cm in diameter, weight of 0.343 g., with a calculated density of 0.056 g/cc.

EXAMPLE 4

A 15% EXPANCEL/85% PTFE by weight sample was made by using the same method as Example 3 except the following component amounts were used:

Slurry of 23.4 g of EXPANCEL—091 DU and 613.6 g of deionized water 132.6 g of PTFE in the form of a 20.0% dispersion 2.1 g of a 0.4% solution of a cationic modified polyacrylimide 35 g sample of screened powder was lubricated with mineral spirits at a ratio of 0.375 cc solvent per gram of powder.

A 19.04 cm long piece of the dried extrudate measuring 0.297 cm in diameter, weighing 1.827 g and a calculated density of 1.383 g/cc was then placed in a convection oven at 165° C. for 3 minutes. Upon removal from the oven the sample was measured to be 37.3 cm long, having a diameter of 0.828 cm, a weight of 1.807 g, and a calculated density of 0.090 g/cc.

EXAMPLE 4a

A 15.0 cm long section was cut from the sample produced in Example 4. A 5.0 cm long section was marked off in the center of this piece using an indelible marker. The sample was placed in a convection oven at 165° C. for 3 minutes. The sample was then grabbed by hand outside of the marks using high temperature gloves. Upon removal from the oven, the sample was immediately and rapidly stretched by separating hands. The time of stretch was estimated to be approximately 0.25 seconds. The sample was then cut at the marks and measurements were taken on the center section. The sample measured to be 21.5 cm long, 0683 cm in diameter, weight of 0.239 g, and a calculated density of 0.030 g/cc.

EXAMPLE 4b

Using the same procedure and sample size as Example 4a the following sample was produced. The sample measured to be 42.0 cm long, 0.612 cm in diameter, weight of 0.240 g, and a calculated density of 0.019 g/cc.

EXAMPLE 4c

A 15.0 cm long section of dried extrudate was cut from the product of Example 4 measuring 0.297 in diameter. A 5.0 cm long section was marked off in the center of this piece using an indelible marker. The sample was placed in a convection oven at 115° C. for 7 minutes. The sample was then grabbed by hand outside of the marks using high temperature gloves. Upon removal from the oven, the sample was immediately and rapidly stretched by separating hands. The time of stretch was estimated to be approximately 0.25 seconds. The sample was then cut at the marks and measurements were taken on the center section. The sample measured to be 64.1 cm long, 0.287 cm in diameter, weight of 0.474 g, with a calculated density of 0.114 g/cc. This sample was then placed unrestrained in a convection oven at 165° C. for 3 minutes. Upon removal from the oven, the sample had a length of 30 cm, a diameter of 0.533 cm, a weight of 0.471 g and a calculated density of 0.070 g/cc.

EXAMPLE 5

A 25% EXPANCEL/75% PTFE by weight was made by using the same method as Example 3 except the following component amounts were used:

Slurry of 39.0 g of EXPANCEL—091 DU and 676.1 g of deionized water 117.0 g of PTFE in the form of a 20.0% dispersion 2.0 g of a 0.4% solution of a cationic modified polyacrylimide 35 g sample of screened powder was lubricated with mineral spirits at a ratio of 0.375 cc solvent per gram of powder.

A 19.04 cm long piece of dried extrudate measuring 0.297 cm in diameter weighing 1.690 g and a calculated density of 1.280 g/cc was then placed in a convection oven at 165° C. for 3 minutes. Upon removal from the oven the sample was measured to be 40.2 cm long, having a diameter of 0.955 cm, and a weight of 1.666 g, and a calculated density of 0.058 g/cc.

EXAMPLE 5a

A 15.0 cm long section was cut from the 0.955 cm diameter sample produced in Example 5. A 5.0 cm long section was marked off in the center of this piece using an indelible marker. The sample was placed in a convection oven at 165° C. for 3 minutes. The sample was then grabbed by hand outside of the marks using high temperature gloves. Upon removal from the oven, the sample was immediately and rapidly stretched by separating hands. The time of stretch was estimated to be approximately 0.25 seconds. The sample was then cut at the marks and measurements were taken on the center section. The sample measured to be 27.0 cm long, 0.648 cm in diameter, weight of 0.203 g, and a calculated density of 0.023 g/cc.

EXAMPLE 5b

A sample of the dried extrudate measuring 0.297 cm in diameter from Example 5 was then tested for breakstrength on a Instron Model 1130. Gauge length (distance between clamps) was two inches. Samples were pulled apart at 10 inches/min with maximum tensile force being recorded. The sample was measured to have a breakstrength of 0.77 lbs.

A sample of the 0.955 c/m diameter from Example 3 was then tested for breakstrength on a Instron Model 1130. Gauge length (distance between clamps) was two inches. Samples were pulled apart at 10 inches/min with maximum tensile force being recorded. The sample was measured to have a breakstrength of 1.78 lbs.

EXAMPLE 6

A slurry of 2610 g of EXPANCEL—091 DU and 45.2 Kg of deionized water was prepared in a 30 gallon stainless steel container. While the slurry was agitating, 7.83 Kg of PTFE in the form of a 20.0% dispersion was rapidly poured into the vessel. The PTFE dispersion was an aqueous dispersion obtained from ICI Americas, Inc. After 20 seconds, 147 g of a 0.4% solution of a cationic modified polyacrylimide was added to initiate the coo coagulation. After a total of 1 minute 44 seconds, the mixer was stopped. The coagulum settled to the bottom of the vessel and the effluent was clear.

The coagulum was dried at about 110° C. in a convection oven. The dried cake was chilled below 0° C. It was hand ground through a 0.635 cm mesh stainless steel screen. A sample of screened powder was lubricated with mineral spirits at a ratio of 0.265 cc solvent per gram of powder. The mixture was chilled, passed through a 0.635 cm mesh screen again, tumbled, then allowed to sit at 18° C. for 16 hours and was re-tumbled.

The powder was then extruded through a 10.1 cm diameter barrel and a 0.203×15.2 cm die at a ram rate of 100 cm/min.

The extruded tape was then allowed to air dry in ambient conditions overnight.

EXAMPLE 6a

A piece of the dried extrudate made in accordance with Example 6 was then placed in a convection oven at 165° C. for 5 minutes. Upon removal from the oven the sample was measured to be 33.3 cm long, 19.4 cm wide, 1.4 cm thick, a weight of 69.72 g, and a calculated density of 0.077 g/cc.

EXAMPLE 6b

Another sample was produced in the same manner as Example 6. A 10 cm long section was marked off in the center of this piece using an indelible marker. The sample was placed in a convection oven at 165° C. for 3 minutes. The sample was then grabbed by hand outside of the marks using high temperature gloves. Upon removal from the oven, the sample was immediately and rapidly stretched by separating hands. The time of stretch was estimated to be approximately 0.25 seconds. The sample was then cut at the marks and measurements were taken on the center section. The sample measured to be 34.7 cm long, 14.3 cm wide, 1.21 cm thick, a weight of 19.64 g, and a calculated density of 0.033 g/cc.

EXAMPLE 6c

Another sample was produced in the same manner as Example 6. This material was measured to have a thickness of 0.208 cm and a width of 14.8 cm. The material was then additionally processed by calendering between two metal rolls using the following gap sizes and output speeds in nine successive steps:

| Steps | 1 | 2 | 3 | 4 | 5 | 6 | 7 | 8 | 9 |
|---|---|---|---|---|---|---|---|---|---|
| GAP (cm) | 0.155 | 0.091 | 0.051 | 0.025 | 0.010 | 0.003 | 0.003 | <.003 | <.003 |
| SPEED (m/min) | 5.5 | 6.1 | 7.0 | 6.7 | 5.2 | 6.4 | 6.1 | 6.1 | 6.1 |

The calendered material had a thickness of 0.0077 cm and a width of 13.2 cm. The material was then placed in a convection oven at 165° C. for 5 minutes. A length of material was cut from the sample and measured to be 44.5 cm long, 39.4 cm wide, 0.036 cm thick, a weight of 5.30 g, and a calculated density of 0.084 g/cc.

EXAMPLE 7

A slurry was mixed consisting of 15.14 g of PTFE in the form of a 60.0% dispersion and 14.91 g of EXPANCEL—091 DU and 10.19 g of distilled water. This yields a solids content of 50% PTFE to 50% EXPANCEL. The PTFE dispersion used was part number TE 30, an aqueous dispersion obtained from E. I. dupont de Nemours and Company, Wilmington, Del. ("Dupont Company").

The slurry was then painted onto a ⅜ inch diameter copper tube using a conventional paint brush and allow to air dry at ambient conditions for 1 hour. The tube was then placed in a convection oven at 165° C. for 3 minutes to expand the EXPANCEL micro-balloons. The tube was then removed and inspected. Good adhesion properties between the coating and the tube were observed.

EXAMPLE 8

A slurry was mixed consisting of 20.94 g of PTFE in the form of a 60.0% dispersion and 27.88 g of EXPANCEL—091 DU and 3.5 g of distilled water. This yields a solids content of 43% PTFE to 57% EXPANCEL. The PTFE dispersion used was part number TE 30, an aqueous dispersion obtained from Dupont Company.

A 24 gauge silver plated copper wire was "dipped" coated with the above slurry by inserting the wire through a small hole in the bottom of the mix container and drawing the wire upwards through the bath. The wire was then hung vertically to dry for approximately 30 minutes at ambient conditions.

The 3.5 ft section of dried coated wire was inserted inside an expanded PTFE tube (e.g. tubing produced according to U.S. Pat. No. 3,953,566 to Gore) of the same length having an inside diameter (I.D.) of 2 mm, an outside diameter (O.D.) of 3 mm, and a porosity of 70%. The assembly was then placed in a convection oven for 3 minutes at 165° C. in order to puff the wire coating so that it fills the annular space between the wire and the PTFE tubing. The sample was removed and allowed to cool. The density of the puffed coating was calculated to be 0.096 g/cc using the known weight and volume of the puffed coating.

The wire assembly was then helically wrapped with aluminized polyester film and tested for velocity of propagation (V.P.). A Techtronics Model CSA 803 was used in TDR mode (time domain reflectometry) to measure velocity of propagation. A cable length of 5.47 ft was measured to have a signal delay of 1.055 ns/ft, which converts to a signal speed of $2.889 \times 10^8$ meters/sec. This signal speed divided by the speed of light in a vacuum ($2.998 \times 10^8$ m/s) yields a V.P. of 96.36%. From this value, the dielectric constant (Er) can be calculated using the equation: $V.P.=1/\sqrt{Er}$. Er for this cable calculates to be 1.077.

EXAMPLE 9

A slurry was mixed consisting of 7.36 g of PTFE in the form of a 60.0% dispersion and 13.67 gms of EXPANCEL—091 DU and 4.5 g of distilled water. This yields a solids content of 35% PTFE to 65% EXPANCEL. The PTFE dispersion used was part number TE 30, an aqueous dispersion obtained from Dupont Company.

A 33 gauge silver plated copper wire was dipped coated with the above slurry by inserting the wire through a small hole in the bottom of the mix container and drawing the wire upwards through the bath. The wire was then hung vertically to dry for approximately 30 minutes at ambient conditions.

The 3.5 ft section of dried coated wire was inserted inside a 43 mil I.D. copper tube of the same length. The assembly was then placed in a convection oven for 4 minutes at 165° C. in order to puff the wire coating so that it fills the annular space between the wire and the copper tubing. The sample was removed and allowed to cool.

A Techtronics Model CSA 803 was used in TDR mode (time domain reflectometry) to measure velocity of propagation. A cable length of 3.240 ft was measured to have a signal delay of 1.037 ns/ft, which converts to a signal speed of $2.939 \times 10^8$ meters/sec. This signal speed divided by the speed of light in a vacuum ($2.998 \times 10^8$ m/s) yields a V.P. of 98.03%. From this value, the dielectric constant (Er) was calculated to be 1.041.

EXAMPLE 10

The following procedure was used for making films of ultra-high molecular weight polyethylene (UHMW-PE) containing 50% EXPANCEL—091 DU by weight.

Solutions of UHMW-PE were prepared in a jacketed reaction vessel capable of maintaining solutions temperatures in excess of 130° C. The vessel was purged with flowing nitrogen. The vessel was also fitted with a thermocouple for determining the solution temperature, and a stirring paddle.

1. The vessel was initially heated to approximately 79° C., at which time 200 g of reagent grade mixed xylenes were added, and equilibrated at temperature.
2. To the stirring solvent, 4.0 g of Hostalon GUR 412 and EXPANCEL—091 DU were slowly added. In addition, 0.04 g of an antioxidant, (IRGANOX 1010) was added.
3. With continued stirring, the temperature of the oil bath was raised to 123° C. Stirring was stopped when the solution temperature reached 117° C., and the stirring paddle was removed. The solution was allowed to equilibrate at temperature for 30 minutes.
4. After equilibration, the hot solution was poured into a glass dish, and loosely covered with aluminum foil. The foil was removed after 30 minutes, and the solvent evaporated overnight.

A piece of the resulting product from the above procedure was measured to be 4.70 cm long, 1.10 cm wide, and 0.358 cm thick, a weight of 0.570 g, and a calculated density of 0.308 g/cc. This piece was placed in a convection oven at 165° C. for 5 minutes and removed. The sample had a puffed appearance. A piece was cut from the puffed sample and was measured to be 8.92 cm long, 2.04 cm wide, and 0.767 cm thick, a weight of 0.534 g, and a calculated density of 0.038 g/cc.

EXAMPLE 11

The following example demonstrates ability to mold and/or selectively puff regions of a sample. A ½–20 inch threaded sleeve was placed between two heat platens set at 200° C. and allowed to reach temperature. A length was cut from the dried extruded beading of Example 5, part of which was inserted into the metal sleeve. After two minutes the sample was removed, the sleeve removed from the sample, and the following observations were made. The region of the sample that had been placed within the sleeve had a puffed outside diameter (O.D.) of ½ inch which matched the inside diameter (I.D.) of the sleeve including the threaded profile. The region which was not inserted within the metal sleeve had a smooth profile and an O.D. of approximately ⅛ inch.

EXAMPLE 12

The following example demonstrates the use of an additional filler with a microsphere/PTFE composite.

A 15% EXPANCEL/25% Carbon Black/60% PTFE by weight sample was made by the following method:

A slurry of 13.8 g of EXPANCEL—091 DU, 23.07 g of Carbon Black, and 987 g of de-ionized water was prepared in a 2 liter baffled stainless steel container. While the slurry was agitating at 500 RPH for 3 minutes, 55.38 g of PTFE in the form of 20.0% dispersion was rapidly poured into the vessel now mixing at 800 RPH. The carbon black used was Ketjenblack type 300J obtained from Akzo Chemical, Inc. After a total of 1 minute 3 seconds, the mixer was stopped. The coagulum settled to the bottom of the vessel and the effluent was clear.

The coagulum was dried at 103° C. in convention oven. The dried cake was chilled below 0° C. It was hand ground through a 0.635 cm mesh screen again, tumbled, then allowed to sit at 18° C. for 16 hours and was re-tumbled.

A 2.54 cm diameter pellet was formed in a cylinder at 200 psi. The cylinder was heated to 100° C. and the pellet was then extruded through a 0.254 cm diameter die at a ram rate of 50.8 cm/min.

A 20 cm long piece of extrudate having a diameter of 0.302 cm was then placed in a convection oven at 165° C. for 3 minutes. Upon removal from the oven the sample was measured to be 21.2 cm long, having a diameter of 0.922 cm, and a weight of 0.989 gms with a calculated density of 0.070 g/cc.

The sample was tested for electrical resistivity using Mil G 83528A standard modified to a 4 point probe instead of a 2 point probe. During testing, the sample was compressed approximately 50%. The surface measurement was 110 ohms yielding a volume resistivity of 191 ohm-cm. An alternative testing method was also used by attaching alligator clips to the sample at a 4 inch spacing. This test yielded a result of 241 ohm-cm. A z-axis test was measured between two plates and also compressed 50%. This test yielded a result of 5.7 ohm-cm.

It should be noted that the compositions can be formed with various fillers to provide specific utility. Examples of possibly suitable fillers include: carbon black, ceramics, chemically activated materials (e.g. silica gel, activated carbon), thermoplastics, metals, metal oxides, elastomers particulates (including particles, rods, or flakes), etc.

Similar material is disclosed in Japanese Laid-Open Patent Application JP 4335044, of Junkosha Company, Ltd., published 24 Nov. 1992, as well as WIPO Patent Applications WO 93/00163 and WO 93/00390 of Minnesota Mining and Manufacturing Co., each published 7 Jan. 1993, each teaching that an expanded PTFE can be formed by mixing unexpanded thermoplastic expandable microspheres into a resin of PTFE and then applying heat to expand the microspheres and the resin into an expanded mass of nodes and fibrils. It should be noted, however, that expandable microspheres presently commercially available under the trademark EXPANCEL® from Nobel Industries Sweden, Sundsvall, Sweden, have certain temperature limitations and other constraints which may restrict their range of possible uses as gasket material.

Through the use of conductive or non-conductive fillers, gaskets can be produced with a wide variety of electrical properties incorporating polymer/microsphere technology. For example, by forming a gasket from PTFE, microspheres and conductive filler, the electrical resistance properties of the gasket will change with application of compressive force upon the gasket. Alternatively, by forming a gasket from PTFE and microspheres and embedding a conductive element therein of metal wire, optical fiber, or other highly conductive material, the properties of the gasket will change in a manner which can be monitored through capacitance or TDR. The changes in electrical response of this material upon compression is expected to be relatively consistent, allowing its use as a monitoring device to assure proper gasket installation.

While the entire gasket may be formed from polymer/ microsphere composition, another possible application of the present invention is shown in FIG. 9. In this instance, the gasket 48 includes a resilient conductive element 50 contained adjacent to its inner edge 52. Ideally, the resilient conductive element 50 comprises a material which will undergo changes in its electrical properties upon the application of stress upon it, and, especially, upon the application of compressive force against it. A conductive thread produced from a polymer/microsphere composition mixed with conductive particulate, such as carbon black, metals, semimetals, ceramics, carbon/metal particulate blends, activated carbons, etc., may be particular suitable in this regard. Again, electrical leads (not shown) should be provided to connect between the conductive element 50 and electrical monitoring apparatus (not shown).

A similar embodiment of the present invention is illustrated in FIG. 10. In this instance, a gasket 54 is provided with an embedded conductive element 56 positioned approximately equal distance between the inner edge 58 and outer edge 60 of the gasket 54. Again, the conductive element 56 should comprise a material which is responsive to either tension or compressive forces on the gasket. This arrangement may be used to provide a more accurate measurement of the pressures acting upon the gasket. Again, electrical leads 62, 64 are provided in electrical communication between the conductive element 56 and electrical monitoring apparatus 24.

It should be appreciated that the conductive element of the present invention can be positioned in virtually any orientation on or within the gasket to provide desired information. Additionally, multiple conductive elements, and perhaps conductive elements providing different electrical information, may also be included within a single gasket to provide even better feedback of gasket operation.

The gasket body 12 construction is application specific and may take any suitable form. For general applications, the gasket may be any pre-formed shape, including essentially circular, rectangular, triangular, ribbon-like, etc., or the gasket may be formed from a flexible, free-formed material, such as ePTFE joint sealant, to allow it to be custom fitted into whatever shape may be required.

Similarly, the gasket body may be constructed from any appropriate material. In addition to the materials already discussed, examples of other materials which may provide a suitable gasket material include TFE, PTFE, expanded PTFE, polyethylene, natural or synthetic rubber, etc.

Although the apparatus described above functions well to determine and verify the amount of compressive force applied to a gasket or other insertable member, with merely a conductive element mounted around the center of the gasket, changes in resistance or other electrical properties over the entire gasket will provide little information concerning the amount of pressure applied at any particular point along the gasket. Two solutions for this problem are available through the embodiments of the present invention illustrated in FIG. 11.

Figure 11:
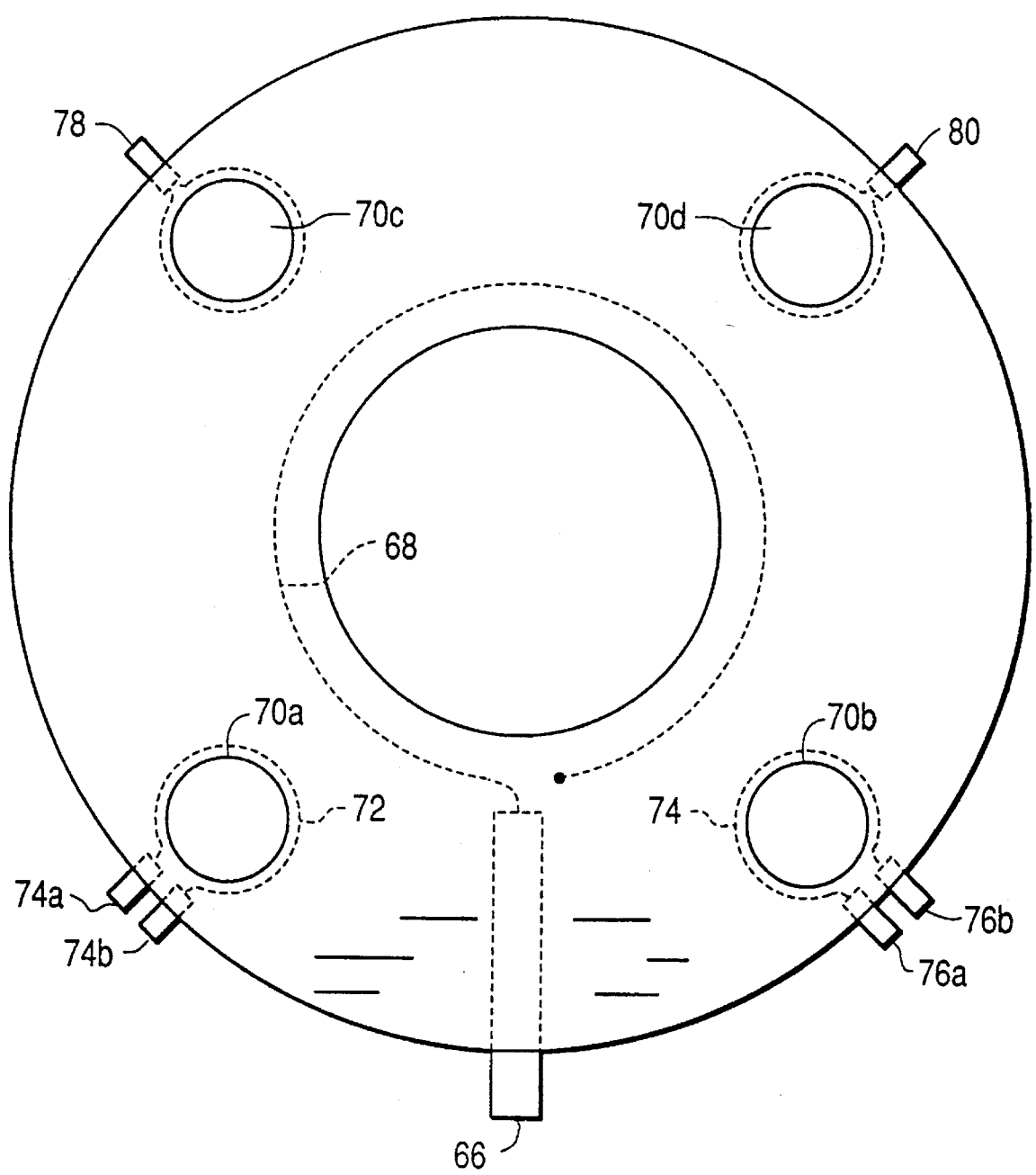
FIG. 11 is a plan view of another embodiment of an insertable member of the present invention in the form of a gasket including conductive elements for sensing leaks and conductive elements for monitoring the amount of compressive force applied to attachment bolts.

First, as has been mentioned, the present invention can employ electrical or optical time domain reflectometry ("TDR") to measure changes in an insertable member. As is shown in FIG. 11, this process employs at least one lead 66 attached to an electrical or optical conductor 68. A time domain reflectometer applies an electrical or optical signal to lead 66 and along the conductor 68. Signal can propagate by the inducement of an electrical field through the conductor 68 which can be provided in at least one of two different ways: by grounding the flange itself; or by providing a shielded cable as the conductive element 68, with the shield being grounded via electrical conductor 68 (which would require an additional electrical contact on lead 66). The time domain reflectometer then monitors the electrical or optical "echo" which returns along the same conductor 68 through lead 66. The return signal is analyzed to determine changes in electrical or optical performance of the conductor 68. Unlike monitoring changes in an electrical property such as resistance between two leads on a conductor (i.e. which can quantify changes but cannot identify where those changes are occurring), the TDR process allows for the possibility of identifying where changes in electrical or optical performance in a conductor have occurred.

A less expensive method of identifying changes in compressive forces applied to an insertable member is also shown in FIG. 11. As is known, it is common for certain gaskets to be provided with openings 70a, 70b, 70c, 70d through which bolts or other mounting means can be attached. By embedding conductive elements 72, 74 around openings 70a, 70b, monitoring apparatus can be attached to leads 76a, 76b, 78a, 78b to determine the particular pressures applied around each of these openings. In this manner the pressure applied to each bolt can be determined and monitored for changes. Another embodiment for monitoring the pressures applied to gasket is likewise shown around openings 70c, 70d wherein a single lead 78, 80 is used to monitor the pressures around the openings through the TDR process previously described. Again, signal can be propagate through this conductor in the manner previously described.

Employing either of these methods, the gasket of the present invention can provide precise feedback on proper installation and maintenance of the gasket. Additionally, a tremendous amount of other useful information can be provided, such as whether component parts are properly aligned or whether they include uneven contact surfaces.

It should be evident from the above description that the present invention has a wide range of possible applications. In addition to the gasket uses already described, the present invention also holds promise as a relatively low-cost method of measuring torque and pressures applied to a wide range of applications. For example, as an insertable member the present invention can be permanently attached between component parts such as girders to assure that correct attachment pressures are used. Due to the relatively low cost of the insertable member, it can be simply abandoned in place once proper installation pressures are confirmed or periodically checked for changes. Similarly, the insertable member of the present invention is particularly useful in monitoring compliance with various government regulations. By installing a gasket or insertable member between hazardous gas or liquid fittings, the necessary amount of sealing pressure can be assured to comply with fluid-tight emission standards or other requirements. Other possible uses as a general insertable member include disposable or reusable truck load sensors, weight sensors, etc.

Without intending to limit the scope of the present invention, the following represent some illustrative examples of how various gaskets and other insertable members of the present invention may be formed and employed:

EXAMPLE 13

A ring gasket was constructed having an embedded conductive polymer fiber. A 1/16 inch thick expanded PTFE gasket material including a release paper covered adhesive backing was employed. This material is commercially available from W. L. Gore & Associates, Inc., of Elkton, Md., under the designation GORE-TEX® GR ring gasket. Two rings were die cut from this material having a 1 1/16 inch I.D. and a 2 1/4 inch O.D. The release paper was removed from one of the rings and a conductive fiber was adhered to the ring approximately 3/16 of an inch from the inner diameter. The fiber used was an expanded PTFE fiber formed in accordance with Example 2, above, with a 230 denier, 15% carbon black loading, twisted 32 twists per inch and heat treated. The release paper was removed from the second ring and it was placed on top of the first ring in alignment with it to completely envelop the conductive fiber. Two leads to the fiber were left exposed to allow for electrical connection to monitoring apparatus.

EXAMPLE 14

A non-sealing insertable member suitable for measuring loads placed upon it can be formed in a method similar to that discussed in Example 13. In this case two identical pads of material are cut from the PTFE gasket material. Release paper is removed from one of the pads and one or more conductive fibers are positioned across the pad. Preferably, the fibers are laid down in a zig-zag or other pattern to maximize the contact area between the fiber and the pad. The release paper is then removed from the second pad and the two pads are attached together to embed the fiber. Again, two leads should be left exposed to allow for attachment to monitoring apparatus.

EXAMPLE 15

Figure 12:
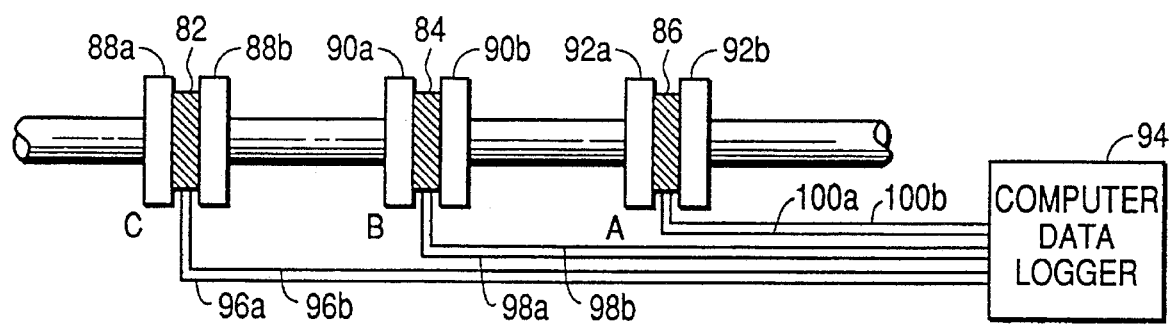
FIG. 12 is a schematic representation of three insertable members of the present invention shown mounted between three respective flange sets and interconnected to a monitoring apparatus.
Figure 13:
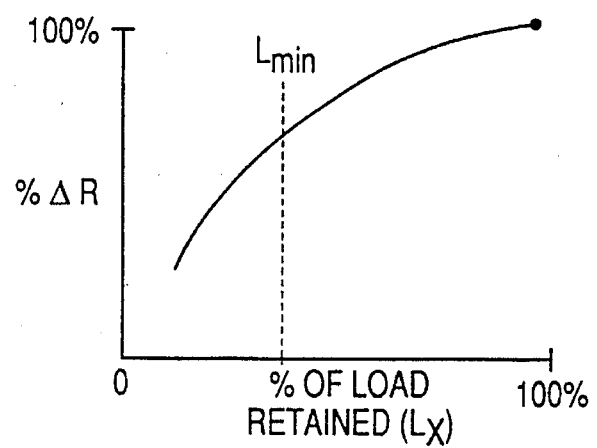
FIG. 13 is a graph of percentage change in resistance of a conductive fiber employed in the embodiment of the present invention illustrated in FIG. 12 verses percentage load retained between the flanges.
Figure 14:
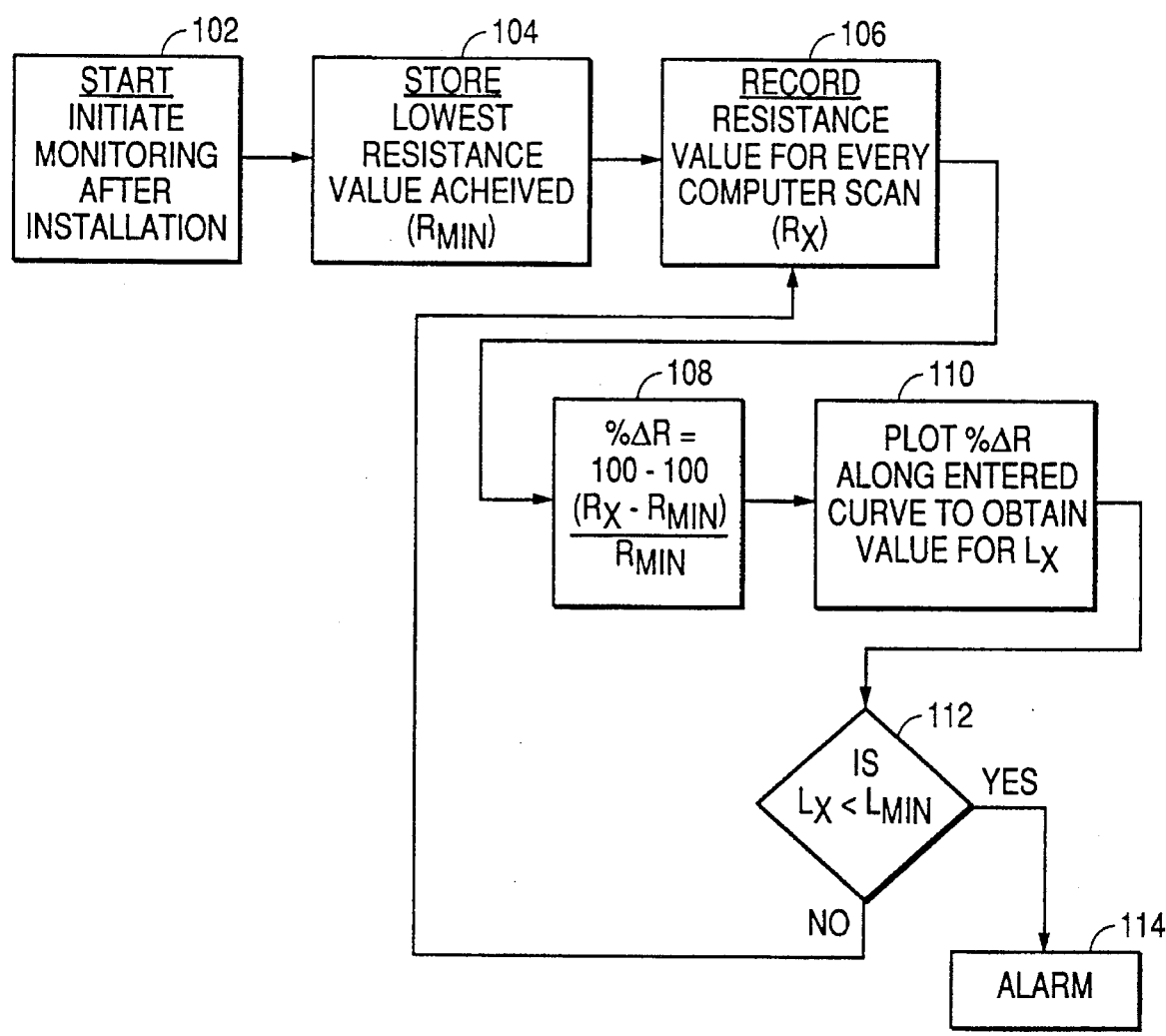
FIG. 14 is a flow chart of one embodiment of processor steps which can be employed to monitor the embodiment of the insertable member of the present invention illustrated in FIG. 12.

Another example of the application of the present invention is shown in FIGS. 12 through 14. Shown in FIG. 12 is a series of three sensing insertable members 82, 84, 86 made in accordance with the present invention placed between respective flanges 88a and 88b, 80a and 90b, and 92a and 92b. Each of the insertable members is in electrical connection to monitoring apparatus 94 via respective wires 96a and 96b, 98a and 98b, and 100a and 100b. It should be noted that multiple insertable members can also be connected along a single wire to the monitoring device where each insertable member's electrical signal is "thumb printed" in some manner, such as with signals set in predetermined phases.

As has been explained, the status of each of the insertable members is monitored by the monitoring apparatus 94 by establishing a base-line signal from the members and then noting changes from that base-line during the operation of the member.

In the system shown in FIG. 12, a conductive element is installed within each of the insertable members which experiences a percentage change in resistance (% $\Delta R$) with a percentage change in load retained ($L_x$). A graphical representation of this relationship is shown in FIG. 13. As is shown, as the percentage load retained between the flanges decreases, there is a corresponding decrease in the percentage change in resistance along the conductive element. The designation $L_{min}$ indicates the point above which the amount of load retained must be kept in order to maintain a proper seal between any one set of the flanges. This curve is characteristic of particular flange, conductive element, and insertable member configuration and may differ from application to application.

By employing a processing unit as the monitoring device, the changes in resistance as a function of change in load can be constantly evaluated. The processing steps for such an evaluation are illustrated in the flow chart of FIG. 14. As is shown, initial monitoring begins at step 102 once the insertable member is installed. At this stage, the lowest resistance value achieved ($R_{min}$) along the conductor is stored in memory in step 104.

During normal operation of the system, regular scans of the resistance values will produce a current resistance value ($R_x$) in step 106. The processor will then calculate the percentage change in resistance (% ΔR) per the formula shown in step 108. Employing an equation generated from the curve shown in FIG. 13, the percentage change in resistance (% ΔR) is used to determine the current $L_x$ valve in step 110. The current $L_x$ value is then compared against the established $L_{min}$ value in step 112. So long as $L_x$ remains greater than $L_{min}$, the processor will repeat steps 106 through 112. If $L_x$ is less than $L_{min}$, then the processor will provide an alarm or other warning signal in step 114. As has been discussed, the processor may also employ the warning signal to control valves or other devices to direct flow automatically around a flange or other device where a fault has been detected in order to maintain system operation without interruption.

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. A gasket apparatus for sealing between components which comprises:

a gasket body;

a conductive element embedded within at least a portion of the gasket body, the conductive element transmitting a changed conductive signal upon change in stress placed upon the gasket;

the conductive element including at least one lead which permits the conductive element to be attached to electrical apparatus;

wherein the conductive element is adapted to receive an electrical signal from the electrical apparatus and the conductive element is adapted to provide a signal to the electrical apparatus;

wherein the condition of the gasket is determined by measuring changes in electrical signals through the conductive element;

wherein the conductive element comprises an electrically conductive polymer; and wherein the conductive element comprises a polyolefin of expanded polytetrafluoroethylene (PTFE) filled with conductive particles which has been twisted along its longitudinal axis so as to densify the PTFE and decrease its volume resistivity.

2. The apparatus of claim 1 wherein the electrical resistance of the conductive element is altered when pressure is applied to the conductive element.

3. The apparatus of claim 2 wherein the polyolefin includes expandable microspheres embedded therein.

4. The apparatus of claim 3 wherein the conductive element comprises a polyolefin comprising an expanded polytetrafluoroethylene (PTFE).

5. The apparatus of claim 1 wherein at least that portion of the gasket body surrounding the conductive element comprises said polyolefin of expanded PTFE which changes its dielectric properties when the material is subjected to stress, and the conductive element and the gasket body interact to provide a changed electrical property through the conductive element when the gasket is subjected to stress.

6. The apparatus of claim 1 wherein the conductive element comprises an optically conductive fiber.

7. A gasket apparatus for sealing between components which comprises:

a gasket body;

a conductive element embedded within at least a portion of the gasket body, the conductive element transmitting a changed conductive signal upon change in stress placed upon the gasket;

the conductive element including at least one lead which permits the conductive element to be attached to electrical apparatus;

wherein the conductive element is adapted to receive an electrical signal from the electrical apparatus and the conductive element is adapted to provide a signal to the electrical apparatus;

wherein the condition of the gasket is determined by measuring changes in electrical signals through the conductive element; and wherein the conductive element comprises a polyolefin of expanded polytetrafluoroethylene (PTFE) filled with conductive particles which has been twisted along its longitudinal axis so as to densify the PTFE and decrease its volume resistivity.

* * * * *

UNITED STATES PATENT AND TRADEMARK OFFICE
CERTIFICATE OF CORRECTION

PATENT NO. : 5,581,019
DATED : December 3, 1996
INVENTOR(S) : Minor et al.

It is certified that error appears in the above-indentified patent and that said Letters Patent is hereby corrected as shown below:

Col. 7, line 42: change "ASTN" to --ASTM--.
Col. 8, 3$^{rd}$ entry, change "6990" to --6890--.
Col. 15, line 56: change "coocoagulation" to --co-coagulation--.
Col. 16, line 62: change "dupont" to --duPont--.
Col. 18, line 65: change "RPH" to --RPM--.
Col. 18, line 67: change "RPH" to --RPM--.
Col 22, line 35: change "80a" to --90a--.

Signed and Sealed this

Twentieth Day of January, 1998

Attest:

BRUCE LEHMAN

Attesting Officer

Commissioner of Patents and Trademarks